United States Patent [19]

Flosbach et al.

[11] Patent Number: 5,466,860
[45] Date of Patent: Nov. 14, 1995

US005466860A

[54] PROCESS FOR THE PREPARATION OF BLOCKED ISOCYANATES

[75] Inventors: Carmen Flosbach; Dieter Philipp; Walter Schubert, all of Wuppertal, Germany

[73] Assignee: Herberts Gesellschaft mit beschrankter Haftung, Wuppertal, Germany

[21] Appl. No.: 385,444

[22] Filed: Feb. 8, 1995

[30] Foreign Application Priority Data

Feb. 17, 1994 [DE] Germany ............... 44 05 042.9

[51] Int. Cl.⁶ .......................... C07C 229/24
[52] U.S. Cl. .................. 560/43; 560/44; 560/169
[58] Field of Search ................ 560/43, 44, 169

[56] References Cited

U.S. PATENT DOCUMENTS

| 3,746,689 | 7/1973 | Narayan et al. | 560/169 X |
| 4,068,086 | 1/1978 | Dalibor | 560/169 |
| 4,132,843 | 1/1979 | Dalibor | 560/169 X |
| 4,220,749 | 9/1980 | Reichmann et al. | 560/169 X |
| 4,340,712 | 7/1982 | Reichmann et al. | 560/169 X |
| 4,393,238 | 7/1983 | Zengel et al. | 564/255 |
| 5,332,965 | 6/1982 | Dalibor | 560/169 |

*Primary Examiner*—Johann Richter
*Assistant Examiner*—Michael G. Ambrose
*Attorney, Agent, or Firm*—Schweitzer Cornman & Gross

[57] ABSTRACT

A process for the preparation of blocked isocyanates by reaction of free isocyanates under water-free conditions with blocking agents containing acid hydrogen in the presence of basic catalysts, these being one or more alkali hydroxides, particularly lithium hydroxide. The process leads to yellowing-free products with a low alkali content which may be used as cross-linking agents for polyols, particularly in the lacquer sector.

8 Claims, No Drawings

PROCESS FOR THE PREPARATION OF BLOCKED ISOCYANATES

BACKGROUND OF THE INVENTION

The invention relates to a process for the preparation of blocked isocyanates, particularly polyisocyanates, with at least two isocyanate groups, which are blocked with blocking agents containing acid hydrogen. The blocked isocyanates obtained are particularly suitable as cross-linking agents for polyols, particularly in the preparation of lacquers.

The preparation of blocked isocyanates, particularly polyisocyanates, by reaction with blocking agents containing acid hydrogen such as dialkyl malonic esters and alkyl acetoacetic esters is known, for example, from DE-A 30 01 060, DE-A 24 36 872 and DE-A 23 42 603. The known processes are carried out using catalysts which are required for the reaction. Alkali metals, preferably sodium, alkali alcoholares, preferably sodium alcoholates, and alkali phenolares are mentioned for the reaction with malonic diesters. Zinc acetyl acetonate is also described for the reaction with acetoacetic esters.

Said known catalysts are strongly basic and difficult to handle. Moreover, it has become apparent that the reaction products obtained are discoloured, frequently yellowed. The catalysts dissolve in the reaction medium and may be removed only by expensive measures.

SUMMARY OF THE INVENTION

The object of the present invention is to provide a process for the preparation of blocked isocyanates, particularly polyisocyanates, with at least two isocyanate groups per molecule, which lead to light, essentially yellowing-free reaction products and permit easy removal of the catalysts used.

Surprisingly, it was ascertained that said object may be achieved by the use of alkali hydroxides, particularly lithium hydroxide. The alkali hydroxides are easy to handle; since they do not dissolve in the reaction medium, they may be removed in a simple manner from the reaction mixture when the reaction has ended, e.g. by filtration.

DETAILED DESCRIPTION OF THE INVENTION

The invention therefore relates to a process for the preparation of blocked isocyanates by reaction of free isocyanates under water-free conditions with blocking agents containing acid hydrogen, in the presence of basic catalysts, which is characterised in that one or more alkali hydroxides are used as basic catalysts.

The invention furthermore relates to the blocked isocyanates obtained and the use thereof, particularly in the form of polyisocyanates as cross-linking agents for polyols. The blocked isocyanates obtained have a particularly low alkali content due to the use of basic catalysts. Said content is preferably less than 100 ppm, particularly preferably less than 80 ppm and less than 50 ppm, calculated as the weight of the alkali metals and based on the weight of the blocked isocyanates.

The process according to the invention may be applied to any isocyanates with free isocyanate functions. It is particularly suitable for blocking polyisocyanates with at least two isocyanate groups. Examples of such polyisocyanates are aliphatic, cycloaliphatic or aromatic polyisocyanates such as, for example, diisocyanates, such as aliphatic, cycloaliphatic and aromatic diisocyanates customary in lacquers, e.g. toluene 2,4-diisocyanate, toluene 2,6-diisocyanate, diphenylmethane 2,4'- and/or 4,4'-diisocyanate, hexamethylene 1,6-diisocyanate, m-xylylene diisocyanate, p-xylylene diisocyanate, tetramethylene diisocyanate, 1-isocyanato-3,3,5-trimethyl- 5-isocyanato-methylcyclohexane (=isophorone diisocyanate= IPDI), or tetramethylxylylene diisocyanate, propylene 1,2-diisocyanate, 2,2,4-trimethylene diisocyanate, tetramethylene diisocyanate, butylene 2,3-diisocyanate, dodecane 1,12-diisocyanate, cyclohexane 1,3- and 1,3-diisocyanate, perhydro-2,4' and/or 4,4'-diphenylmethane diisocyanate, phenylene 1,3- and 1,4-diisocyanate, 3,2'-and/or 3,4'-diisocyanato-4-methyldiphenylmethane, naphthalene 1,5-diisocyanate, triphenylmethane 4,4'-triisocyanate or mixtures of said compounds.

In addition to said simple isocyanates, those that contain heteroatoms in the group linking the isocyanate groups are also suitable. Examples thereof are polyisocyanates having carbodiimide groups, allophanate groups, isocyanurate groups, urethane groups, acylated urea groups and biuret groups.

The known polyisocyanates that are usually used in the preparation of lacquers are particularly suitable for the invention, e.g. modifying products of the above-mentioned simple poiyisocyanates having biuret, isocyanurate or urethane groups, particularly polyisocyanates having tris-(6-isocyanatohexyl) biuret or low molecular weight urethane groups, of the kind that may be obtained by reaction of IPDI used in excess with simple polyhydric alcohols in the molecular weight range of 62 to 300, particularly with trimethylol propane. Of course, any mixtures of the polyisocyanates mentioned may also be used for the preparation of the products according to the invention.

Suitable polyisocyanates are, moreover, the known prepolymers having terminal isocyanate groups, of the kind that are accessible particularly by reaction of the above-mentioned simple polyisocyanates, mainly diisocyanates, with deficient quantities of organic compounds with at least two groups that are reactive towards isocyanate groups. Compounds with a number average molar mass of 300 to 10000, preferably 400 to 6000 having a total of at least two amino groups and/or hydroxyl groups are used in preference as such. The corresponding polyhydroxyl compounds, e.g. the hydroxyl polyesters, hydroxyl polyethers and/or hydroxyl group-containing acrylate resins inherently known in polyurethane chemistry are used in preference.

The use of copolymers of the vinylically unsaturated monoisocyanate dimethyl-m-isopropenylbenzyl isocyanate, as described inter alia in DE-A 41 37 615, is also possible.

In said known prepolymers, the ratio of isocyanate groups to hydrogen atoms reactive towards NCO corresponds to 1.05 to 10:1, preferably 1.1 to 3:1, the hydrogen atoms originating preferably from hydroxyl groups.

The nature and quantity ratios of the starting materials used in the preparation of NCO prepolymers are chosen, moreover, preferably such that the NCO prepolymers a) have a mean NCO functionality of 2 to 4, preferably 2 to 3 and b) have a number average molar mass of 500–10000, preferably 800–4000.

Known blocking agents containing acid hydrogen may be used for the process according to the invention. Examples thereof are dialkyl malonic esters and alkyl acetoacetic esters. The alkyl groups of the esters, which in the dialkyl malonic ester may be the same or different, have preferably 1 to 4 carbon atoms.

Examples of diaikyl malonic esters are $C_1$–$C_4$ alkyl esters, such as, for example, dimethyl, diethyl, diisopropyl, di-tert. butyl malonate, diethyl malonate being particularly preferred. Examples of alkyl acetoacetic esters are $C_1-C_4$ alkyl esters such as methyl, ethyl, isopropyl, tert.-butyl acetoacetate, ethyl acetoacetate being particularly preferred. It is also possible to use mixtures of said esters.

The molar ratio of the blocking agents containing acid hydrogen to the NCO groups of the isocyanates, for example, the ratio of the dialkyl malonic esters and/or alkyl acetoacetic esters to NCO groups may range, for example, from 0.5:1 to 1:1.5. In the case of an NCO excess, the free NCO groups may optionally be reacted with other reactants.

The catalysts used for the process according to the invention are alkali hydroxides, for example, alkali metal hydroxides such as lithium, sodium and/or potassium hydroxide. The water-free alkali metal hydroxides are used in preference. Lithium hydroxide is used in particular preference. The catalysts are used in catalytic quantities, for example, in quantities of 0.1 to 2% by wt., preferably 0.3 to 1% by wt., based on the weight of isocyanate and blocking agent.

The catalysts are used in solid form, for example, in the form of a powder.

The addition of the blocking agent to the isocyanate is carried out under water-free conditions, preferably with the careful exclusion of moisture. The reaction may be carried out, for example, under a dry inert gas, such as nitrogen.

The reaction may take place without solvents or in the presence of organic solvents. Suitable solvents are, in particular, those that do not react with polyisocyanates. Examples of such solvents are organic solvents, such as aliphatic and aromatic hydrocarbons, for example, xylene, mixtures of aliphatic and/or aromatic hydrocarbons, esters and ethers.

In preference, the reaction is carried out in such a way that the catalyst is dispersed in the isocyanate and the optionally present solvent, and the blocking agent, for example, the dialkyl malonic ester or the alkyl acetoacetic ester, is added in small portions.

The reaction may be carried out with heating. The temperature is, for example, 50° to 100° C., preferably 80° to 100 ° C.

The reaction is carried out at the given temperature until the NCO content has fallen to the desired NCO number. As a rule, the reaction is broken off by cooling to room temperature when the NCO number has reached a value of less than 0.5%. It may also be advantageous, however, when a certain NCO number has been reached, to add to the reaction mixture components that are capable of reacting with isocyanate groups. These may be customary capping agents such as, for example, epsilon-caprolactone, butanone oxime and the other capping agents well-known to the expert. For the reaction of the remaining NCO groups, however, monoalcohols such as, for example, methanol, ethanol, propanol or butanol may also be used. The reaction of the remaining NCO groups with the other components described above may also be carried out with heating, for example, in the above-mentioned temperature range of 50° to 100 ° C., preferably 80° to 100° C.

The method of operating described above is a preferred method of operating. In principle, the reaction components may be reacted in any known way. For example, the reaction of isocyanate with blocking agent may also be carried out such that the blocking agent and the catalyst are charged and the isocyanate, optionally dissolved in solvent, is added dropwise. The other reaction conditions are the same as in the preferred process described above.

In the process according to the invention it is possible, after the reaction has ended, to remove easily the catalyst that remains undissolved in the reaction medium. This may be carried out, for example, by filtering or centrifuging. Optionally, the reaction product may be diluted beforehand or afterwards with solvents. In this case, solvents that can react with free polyisocyanates may also be used. Suitable solvents are organic solvents, particularly solvents customary in lacquers, such as aromatic hydrocarbons, for example, xylene, aliphatic hydrocarbons, for example, n-hexane or cyclohexane, mixtures of aliphatic and/or aromatic hydrocarbons, ketones such as, for example, acetone, methylisopropyl ketone, esters such as, for example, butyl acetate or ethyl acetate, ethers such as, for example, methoxypropanol or butoxypropanol. Alcohols, such as, for example, isopropanol or hexanol, may, however, also be used.

The reaction products prepared according to the invention may be converted to the aqueous phase with the aid of a customary emulsifier or an emulsifying resin. If an emulsifier is used, nonionic commercial emulsifiers are preferred. Emulsification takes place, e.g. by homogenising the reaction product and the emulsifier, optionally with heating, for example, to temperatures of 30° to 80° C. e.g. 60° C. Such a mixture may be emulsified in a customary homogenising device. Examples thereof are rotor/stator homogenisers operating with rates of rotation of, for example, 8000 to 10000 revolutions per minute. The emulsifiers are used, for example, in quantities of 3 to 30% by wt., based on the reaction product. If a water-dilutable resin is used as emulsifying resin, it is possible to proceed in such a way that, in so far as acid groups are contained in the resin, neutralisation is carried out with a customary base, e.g. ammonia or an organic amine, e.g. triethylamine. The reaction product according to the invention may then be mixed into the neutralised resin concentrate obtained and the resulting mixture then emulsified in water. This may take place, for example, with vigorous stirring and, if necessary, with heating, for example, to temperatures of 30° to 70 ° C., e.g. 50 ° C.

During the preparation of the emulsifying resins, it is also possible to polymerise monomers with basic groups, e.g. those containing tertiary amines. The resin containing basic groups prepared in this way may then be neutralised with acids, e.g. inorganic or organic acids such as formic acid, acetic acid and, after the addition of the reaction product according to the invention, then emulsified in water.

It is also possible to neutralise the emulsifying resin partially or wholly with bases or acids and then to emulsify it with a quantity of water such that a water-in-oil emulsion is produced. When the reaction product according to the invention is added, it orients itself towards the resin phase and, by the addition of further quantities of water, phase reversal to the oil-in-water emulsion takes place.

The reaction products obtained by the process according to the invention are isocyanates, particularly polyisocyanate, containing, for example, at least one, and in the case of polyisocyanates at least two of the following groups:

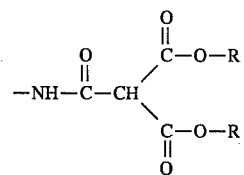

-continued
or

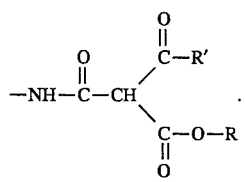

R=alkyl (the same or different)

R'=methyl.

Blocked or capped isocyanates of this kind have the property of being converted back to polyisocyanates on heating. They may therefore be reacted in a controlled manner, with heating, with compounds containing groups that react with isocyanate, such as, for example, hydroxyl groups or amino groups. Blocked polyisocyanates prepared according to the invention may be used, for example, as cross-linking agents or hardeners for storing lacquers containing binders with groups that react with isocyanate, for example, hydroxy-functional and amine-functional binders. The reaction products obtained according to the invention react with hydroxy-functional binders with transesterification or, at a higher stoving temperature, with de-blocking and urethane formation. The polyisocyanates obtained according to the invention are particularly suitable for lacquers, e.g. multi-coat lacquers. They may be used, e.g. in fillers, base lacquers, clear lacquers, finishing lacquers and two-coat finishing lacquers. As they are not liable to yellowing, they are also particularly suitable as hardener components, for example, for single-component storing lacquers and for the production of wire-coating insulations.

In the examples that follow, parts (P) and % refer to the weight.

EXAMPLE 1

Reaction of isophorone diisocyanate-isocyanurate with diethyl malonate

376 P of isophorone diisocyanate-isocyanurate (obtainable from Hüls under the trade name Vestanat IPDI T-1890) are dissolved in 350 P of Solvesso 100 with heating to 80° C. Subsequently, 4 P of water-free lithium hydroxide are added. Then 271 P of diethyl malonate are added dropwise in such a way that the reaction temperature does not exceed 90° C. The reaction mixture is kept at 90° C. until an NCO content of <0.5% is reached. The undissolved lithium hydroxide is filtered by filtration over a 1 μm filter.

Final values: solids (1 h/150° C.): 60.7, viscosity (25° C.): 2400 mPas, colour number (Gardner): 2; lithium content (atomic absorption spectroscopy): 48 ppm Comparative Test Similar to example 1) but with 6 P lithium methanolate as catalyst Final values: solids (1 h/150° C.): 60.2%, viscosity (25° C.): 5795 mPas, colour number (Gardner): 6; lithium content (atomic absorption spectroscopy): 126 ppm.

EXAMPLE 2

Reaction of hexamethylene diisocyanate-isocyanurate with diethyl malonate

In the same way as example 1), 351 P of hexamethylene diisocyanate-isocyanurate (obtainable from Rhone-Poulenc under the trade name Tolonat HDT/100) are reacted with 295 P of diethyl malonate in 350 P of Solvesso 100 in the presence of 4.3 P of water-free lithium hydroxide.

Final values: solids (1 h/150° C.): 60.3%; viscosity (25° C.): 680 mPas; colour number (Gardner): 1.

EXAMPLE 3

Reaction of isophorone diisocyanate-isocyanurate with ethyl acetoacetate

In the same way as example 1), 410 P of Vestanat IPDI T-1890 are reacted with 240 P of ethyl acetoacetate in 350 P of Solvesso 100 in the presence of 4.1 P of water-free lithium hydroxide.

Final values: solids (1 h/150° C.): 61%; viscosity (25° C.): 1300 mPas; colour number (Gardner): 3.

We claim:

1. A process for the preparation of blocked isocyanates by reaction of free isocyanates under water-free conditions with blocking agents containing acid hydrogen in the presence of basic catalysts, characterised in that one or more alkali hydroxides are used as basic catalysts.

2. A process according to claim 1, characterised in that lithium hydroxide is used as alkali hydroxide.

3. A process according to claim 1, characterised in that polyisocyanates with at least two isocyanate groups per molecule are reacted as isocyanates.

4. A process according to one of claim 1, characterised in that dialkyl malonic esters and/or alkyl acetoacetic esters are reacted as blocking agents.

5. A process according to claim 1, characterised in that the reaction is carried out without solvents or in the presence of organic solvents.

6. A process according to claim 1, characterised in that the reaction is carried out with heating.

7. A process according to claim 1, characterised in that the catalysts are removed by filtration or centrifuging after the reaction has ended.

8. A process according to claim 1, characterised in that the reaction product obtained is then converted to the aqueous phase.

* * * * *